(12) United States Patent
Storz et al.

(10) Patent No.: US 9,348,665 B2
(45) Date of Patent: May 24, 2016

(54) MAPPING MESSAGES BETWEEN WEB SERVICES

(75) Inventors: Dietmar Storz, Heidelberg (DE);
Bertram Vielsack, Malsch (DE); Otto Böhrer, Wiesloch (DE); Hartwig Seifert, Elchesheim-Illingen (DE); Thomas Kunz, Lobbach/Lobenfeld (DE); Joerg Kraemer, Sinsheim (DE); Frank Gales, Speyer (DE); Knut Thies, Tholey-Uberroth (DE); Duong-Han Tran, Bad Schönborn (DE); Wei-Guo Peng, Dallau (DE); Roland Preussmann, Karlsruhe (DE); Stefan Rossmanith, Walldorf (DE)

(73) Assignee: SAP SE, Walldorf (DE)

( * ) Notice: Subject to any disclaimer, the term of this patent is extended or adjusted under 35 U.S.C. 154(b) by 439 days.

(21) Appl. No.: 13/484,883

(22) Filed: May 31, 2012

(65) Prior Publication Data
US 2013/0326087 A1 Dec. 5, 2013

(51) Int. Cl.
*G06F 15/16* (2006.01)
*G06F 9/54* (2006.01)

(52) U.S. Cl.
CPC .................................. *G06F 9/541* (2013.01)

(58) Field of Classification Search
CPC .......... G06F 15/16; G06F 13/00; G06F 9/54; G06F 9/541; H04L 29/08072; H04L 29/08756
USPC .................. 709/227, 228, 230, 246
See application file for complete search history.

(56) References Cited

U.S. PATENT DOCUMENTS

| 7,185,342 | B1* | 2/2007 | Carrer et al. ................... 719/313 |
| 7,216,203 | B1* | 5/2007 | Bagewadi ....................... 711/137 |
| 7,373,424 | B2 | 5/2008 | Surma et al. |
| 7,380,205 | B2 | 5/2008 | Bezrukov |
| 7,562,347 | B2 | 7/2009 | Baumgart et al. |
| 7,565,443 | B2 | 7/2009 | Rossmanith et al. |
| 7,573,901 | B2 | 8/2009 | Hofmann et al. |
| 7,581,105 | B2 | 8/2009 | Dietl |
| 7,587,386 | B2 | 9/2009 | Rabetge et al. |
| 7,603,476 | B1* | 10/2009 | Hofmann ................. G06F 9/546 709/232 |
| 7,617,236 | B2 | 11/2009 | Gaurav et al. |
| 7,624,092 | B2 | 11/2009 | Lieske et al. |
| 7,624,122 | B2 | 11/2009 | Gaurav et al. |
| 7,685,304 | B2* | 3/2010 | Kothari et al. ................. 709/230 |

(Continued)

OTHER PUBLICATIONS

SAP (Creating a Logical Port (SAP Library—SAP Exchange Infrastructure), Mar. 31, 2007, p. 1-2)http://help.sap.com/saphelp_nw04/helpdata/en/16/285d32996b25428dc2eedf2b0eadd8/content.htm.*

(Continued)

*Primary Examiner* — Christopher Biagini
(74) *Attorney, Agent, or Firm* — Fish & Richardson P.C.

(57) ABSTRACT

Techniques for mapping of messages includes receiving, from a first web service, a message comprising one or more operations in a first format; identifying a mapping interface that is based on the first web service, the mapping interface comprising one or more mappings for each of the operations of the message; identifying a second web service that is associated with the identified mapping interface; mapping the message to the second web service such that the one or more operations are in a second format associated with the second web service; and assigning a logical port connection to the second web service.

18 Claims, 4 Drawing Sheets

(56) References Cited

U.S. PATENT DOCUMENTS

| | | | |
|---|---|---|---|
| 7,689,709 B2 | 3/2010 | Surma et al. | |
| 7,693,948 B2 | 4/2010 | Heix et al. | |
| 7,783,723 B2 | 8/2010 | Peng et al. | |
| 7,849,445 B2 | 12/2010 | Tran | |
| 7,865,606 B1 | 1/2011 | Tewes et al. | |
| 7,971,209 B2 | 6/2011 | Eberlein et al. | |
| 8,086,758 B1 | 12/2011 | Allan et al. | |
| 8,205,007 B2* | 6/2012 | Surma et al. | 709/236 |
| 8,661,103 B2* | 2/2014 | Mehta et al. | 709/223 |
| 2002/0051529 A1* | 5/2002 | Yi | H04Q 3/0025 379/230 |
| 2002/0144156 A1* | 10/2002 | Copeland, III | 713/201 |
| 2003/0191799 A1* | 10/2003 | Araujo et al. | 709/203 |
| 2003/0204612 A1* | 10/2003 | Warren | 709/230 |
| 2004/0236796 A1 | 11/2004 | Bhatt et al. | |
| 2005/0138113 A1 | 6/2005 | Brendle et al. | |
| 2006/0020678 A1 | 1/2006 | Kessler et al. | |
| 2006/0129605 A1* | 6/2006 | Doshi | 707/104.1 |
| 2006/0206559 A1* | 9/2006 | Xie et al. | 709/201 |
| 2007/0086430 A1* | 4/2007 | Kemp | 370/352 |
| 2007/0150610 A1* | 6/2007 | Vassilev et al. | 709/230 |
| 2007/0233574 A1 | 10/2007 | Koegler et al. | |
| 2008/0120129 A1 | 5/2008 | Seubert et al. | |
| 2008/0288513 A1 | 11/2008 | Bezrukov et al. | |
| 2008/0288549 A1 | 11/2008 | Rabetge et al. | |
| 2008/0288960 A1 | 11/2008 | Eberlein et al. | |
| 2009/0138891 A1 | 5/2009 | Winig et al. | |
| 2009/0327868 A1 | 12/2009 | Tsukikawa | |
| 2010/0011376 A1 | 1/2010 | Bhattacharyya et al. | |
| 2010/0070556 A1 | 3/2010 | Heusermann et al. | |
| 2010/0082497 A1 | 4/2010 | Bieseman et al. | |
| 2010/0161712 A1 | 6/2010 | Mehta et al. | |
| 2011/0078654 A1 | 3/2011 | Thies et al. | |
| 2011/0125821 A1 | 5/2011 | Roshen | |
| 2011/0307295 A1 | 12/2011 | Steiert et al. | |
| 2012/0005263 A1 | 1/2012 | McWhirter et al. | |

OTHER PUBLICATIONS

SAP (Programming with client and Server Proxies (SAP Library—SAP Exchange Infrastructure), May 10, 2007, p. 1-1) http://help.sap.com/saphelp_nw04/helpdata/en/c9/74246d8ad2447799063d39013e9a11/content.htm.*

EPO Communication and Search Report re EPO Application No. 13002732.9-1957; mailed Nov. 6, 2013; (8 pages).

SAP Basis, www.it.toolbox.com/wiki/index.php/SAP_Basis, last visited on May 31, 2012 (1 page).

* cited by examiner

| External Name | Domain Name | Internal Name | Type | Description |
|---|---|---|---|---|
| Fascade2 | http://gugo | IMF_FASCADE2 | Consumer Mapping | |
| MAP_1 | http://proxy.xyz.co | IMF_SPRXT_MAP_1 | Consumer Mapping | |
| MAP_2 | http://proxy.xyz.co | IMF_SPRXT_MAP_2 | Consumer Mapping | |
| SRT_TEST_ASYNCHRONOUS | | IMF_SRT_TEST_ASYNCHRONOUS | Consumer Mapping | |

Details of Consumer Mapping: IMF_SRT_TEST_ASYNCRONOUS

| Logical port | State | Target Proxy Name | Target Proxy Log. Port |
|---|---|---|---|
| TEST_JK1_MEDIATION_LP | Aktiv | CO_SRT_TARGET_PROVIDER_ASYNC1 | SRT_TARGET_PROVIDER_ASYNC1 |
| | | CO_SRT_TARGET_PROVIDER_ASYNC2 | SRT_TARGET_PROVIDER_ASYNC2 |
| | | CO_SRT_TARGET_PROVIDER_ASYNC3 | SRT_TARGET_PROVIDER_ASYNC3 |
| TEST_JK_MEDIATION_LP | Aktiv | CO_SRT_TARGET_PROVIDER_ASYNC | SRT_TARGET_PROVIDER_ASYNC1 |

MAPPING MESSAGES BETWEEN WEB SERVICES

TECHNICAL BACKGROUND

This disclosure relates to mapping of messages and, more particularly, mapping of messages between web services.

BACKGROUND

Within an application, a consumer proxy can be called to execute a particular web service. However, in a particular computing system (e.g., a partner computing system), the particular web service may not exist. Instead of employing the particular web service, a similar web service with a differing interface (as compared to the particular web service) may be employed. For example, the similar web service can include other field names or other structures.

SUMMARY

This disclosure describes systems, methods, apparatus, and computer-readable media for mapping of messages. In some embodiments, a message is received from a first web service. The message includes one or more operations in a first format. In some examples, an application of a host computing system includes the first web service. A mapping interface is identified that is based on the first web service. The mapping interface includes one or more mappings for each of the operations of the received messages. In some examples, the mappings for each of the operations include asynchronous mappings, synchronous mappings, or both. A second web service is identified that is associated with the identified mapping interface. In some examples, an application of a partner computing system includes the second web service. The received message (from the first web service) is mapped to the second web service such that the operations (of the message) are in a second format associated with the second web service. A logical port connection is assigned to (or associated with) the second web service.

A general embodiment of the subject described in this disclosure can be implemented in methods that include identifying a mapping interface that is based on the first web service, the mapping interface including one or more mappings for each of the operations of the message; identifying a second web service that is associated with the identified mapping interface; mapping the message to the second web service such that the one or more operations are in a second format associated with the second web service; and assigning a logical port connection to the second web service.

Other general embodiments include corresponding computer systems, apparatus, and computer programs recorded on one or more computer storage devices, each configured to perform the actions of the methods. A system of one or more computers can be configured to perform operations to perform the actions. One or more computer programs can be configured to perform particular operations or actions by virtue of including instructions that, when executed by data processing apparatus, cause the apparatus to perform the actions.

In a first aspect combinable with any of the general embodiments, the one or more mappings for each of the operations include asynchronous mappings, synchronous mappings, or both.

A second aspect combinable with any of the previous aspects includes providing the mapped message to the second web service.

A third aspect combinable with any of the previous aspects includes identifying a multiple second web services, and mapping the message to the second web services.

A fourth aspect combinable with any of the previous aspects includes splitting the message into two or more messages.

A fifth aspect combinable with any of the previous aspects includes mapping each of the split messages to one of the second web services such that the operations of each split message are in a format associated with the respective second web service.

A sixth aspect combinable with any of the previous aspects includes storing the message in a repository prior to mapping the message.

A seventh aspect combinable with any of the previous aspects includes receiving a multiple messages in a sequence.

An eighth aspect combinable with any of the previous aspects includes mapping the messages according to the sequence.

A ninth aspect combinable with any of the previous aspects includes receiving an additional message related to the mapped message, the additional message including one or more additional operations in the second format.

A tenth aspect combinable with any of the previous aspects includes identifying an additional mapping interface that is based on the second web service, the additional mapping interface including one or more mappings for each of the additional operations of the additional message.

An eleventh aspect combinable with any of the previous aspects includes identifying the first web service that is associated with the additional mapping interface.

A twelfth aspect combinable with any of the previous aspects includes mapping the additional message to the first web service such that the one or more additional operations are in the first format are associated with the first web service.

A thirteenth aspect combinable with any of the previous aspects includes assigning an additional logical port connection to the first web service.

In a fourteenth aspect combinable with any of the previous aspects, the additional message is a response to the mapped message, a fault related to the mapped message, or both.

In a fifteenth aspect combinable with any of the previous aspects, the message is a XML message.

Various embodiments of a mapping proxy module according to the present disclosure may have one or more of the following features. For example, mapping between web services can be modeled and implemented without modifying an application.

These general and specific aspects may be implemented using a device, system or method, or any combinations of devices, systems, or methods. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions. The details of one or more implementations are set forth in the accompanying drawings and the description below. Other features, objects, and advantages will be apparent from the description and drawings, and from the claims.

DETAILED DESCRIPTION

This disclosure describes systems, methods, apparatus, and computer-readable media for mapping of messages. In some embodiments, a message is received from a first web service. The message includes one or more operations in a first format. In some examples, an application of a host computing system includes the first web service. A mapping interface is identified that is based on the first web service. The mapping interface includes one or more mappings for each of the operations of the received messages. In some examples, the mappings for each of the operations include asynchronous mappings, synchronous mappings, or both. A second web service is identified that is associated with the identified mapping interface. In some examples, an application of a partner computing system includes the second web service. The received message (from the first web service) is mapped to the second web service such that the operations (of the message) are in a second format associated with the second web service. A logical port connection is assigned to (or associated with) the second web service.

Figure 1:
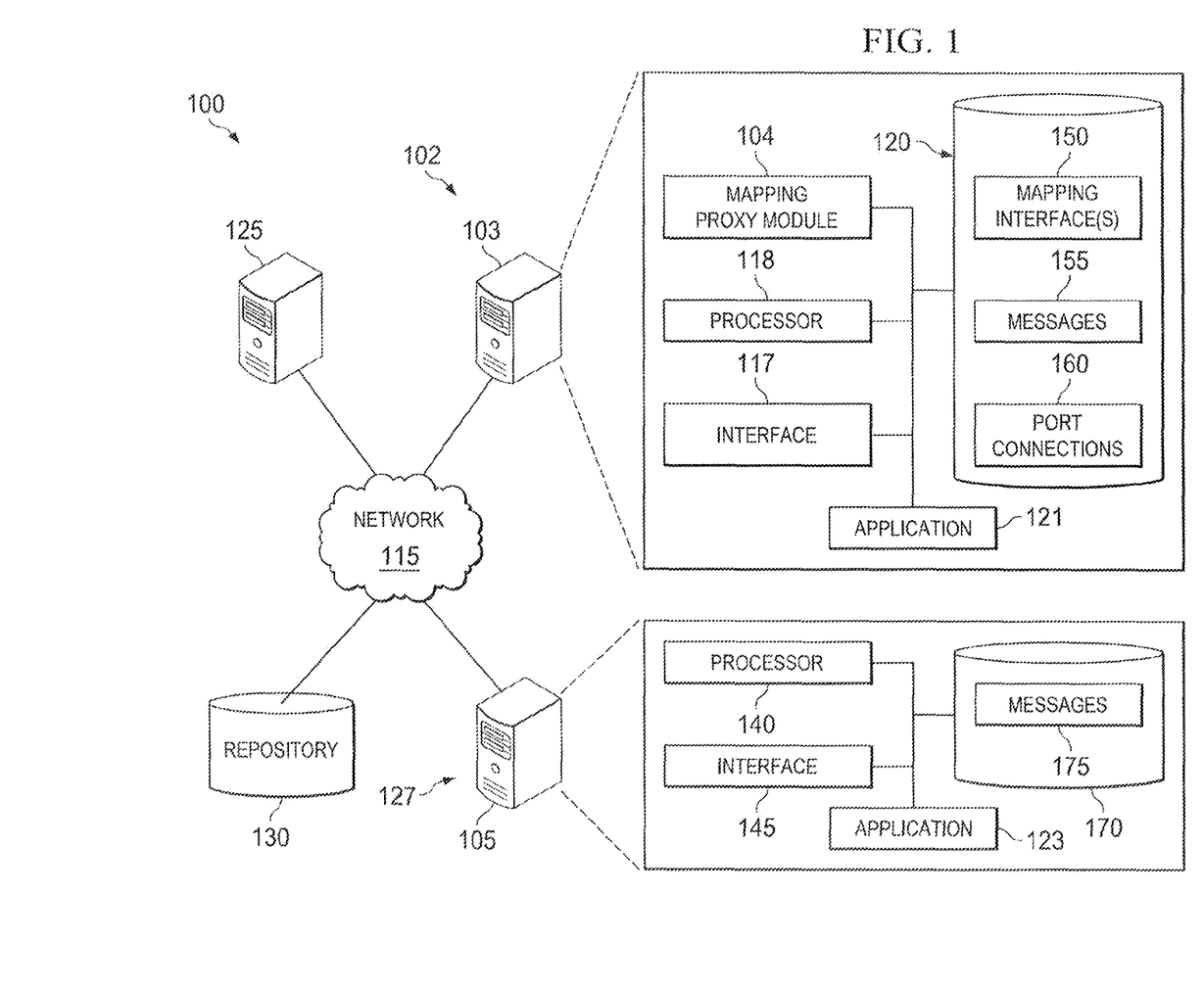
FIG. 1 illustrates an example distributed computing system operable to map messages between web services.

FIG. 1 illustrates an example distributed computing system operable to map messages between web services. For example, the illustrated environment 100 includes or is communicably coupled with a host computing system 102, an enterprise computing system 125, a partner computing system 127, and a repository 130, at least some of which communicate across a network 115. In general, the environment 100 depicts an example configuration of a system for connecting applications (e.g., web services) in the host computing system 102 and the partner computing system 127. The environment 100 is an example environment, and in some embodiments, the elements illustrated in FIG. 1 may be included in or associated with different and/or additional servers, clients, networks, and locations other than those as shown. For example, one or more of the components illustrated within the host computing system 102, the enterprise computing system 125, the partner computing system 127, or any of the other illustrated components may be located in multiple or different servers, cloud-based networks, or other accessible locations (e.g., either directly or indirectly via network 148).

At a high level, the host computing system 102 can receive inbound communication from the partner computing system 127 or send outbound communication to the partner computing system 127 via the network 115. The inbound and outbound communication can include content of various protocols, such as WS protocol, XI protocol, REST protocol, and others. The host computing system 102 includes an application 121 (or multiple applications 121) and the partner computing system 127 includes an application 123 (or multiple applications 123). The applications 121 and 123 can initiate messages sent between the host computing system 102 and the partner computing system 127 (e.g., messaging between web services). Specifically, the applications 121 and 123 can be any application, program, module, process, or other software that may execute, change, delete, generate, or otherwise manage information associated with the respective computing system (the host computing system 102 and the partner computing system 127). In particular, business processes communicate with other users, applications, systems, and components to send, receive, and process messages (e.g., responses, requests, and faults).

In some examples, the application 121 may operate in response to and in connection with one or more messages (e.g., a request) received from an associated partner (e.g., the partner computing system 127) or other remote client. Additionally, the application 121 may operate in response to and/or in connection with one or more messages (e.g., requests) received from the application 123 of the partner computing system 127. In some examples, the application 121 may request additional processing or information from an external system or application. In some examples, the applications 121 and 123 may represent a web-based applications accessed and executed by remote computing systems via the network 115 (e.g., through the Internet, or via one or more cloud-based services associated with the applications 121 and 123). Further, while the applications 121 and 123 are illustrated as internal to the host computing system 102 and the partner computing system 127, respectively, in some examples, one or more processes associated with the applications 121 and 123 may be stored, referenced, or executed remotely. For example, a portion of the applications 121 and 123 may be a web service that is remotely called, while another portion of the applications 121 and 123 may be an interface object or agent bundled for processing at a remote system (not illustrated). In some examples, any or all of the applications 121 and 123 may be a child or sub-module of another software module or enterprise application. In some examples, portions of the applications 121 and 123 may be executed or accessed by a user working directly at the host computing system 102 and the partner computing system 127, respectively.

The illustrated host computing system 102 includes a server 103. In general, the server 103 stores one or more hosted applications. In some instances, the server 103 may store one or more various hosted applications, while in other instances, the server 103 may be a dedicated server meant to store and execute only a single hosted application (e.g., the mapping proxy module 104). At a high level, the server 103 includes an electronic computing device operable to receive, transmit, process, store, or manage data and information associated with the environment 100. For example, the illustrated server 103 may be responsible for receiving application requests (e.g., messages) from one or more applications (e.g., the application 123) of the components (e.g., the partner computing system 127) of the environment 100 and responding to the received requests by processing said requests in an associated hosted application (e.g., the application 121), and sending the appropriate response (message) from the hosted application (e.g., the application 121) back to the requesting client application (e.g., the application 123). In addition to requests from the application 123 of the partner computing system 127, requests associated with the hosted applications may also be sent from internal users, external or third-party customers, other automated applications, as well as any other appropriate entities, individuals, systems, or computers.

The server 103 includes the mapping proxy module 104 to facilitate mapping of messages between the application 121 (e.g., a first web service) of the host computing system 102 and the application 123 (e.g., a second web service) of the partner computing system 127. In some embodiments, the mapping proxy module 104 can be implemented by and stored by any combination of the host computing system 102, the enterprise computing system 125, the partner computing system 127, or the repository 130.

As used in the present disclosure, the term "computer" is intended to encompass any suitable processing device. For example, although FIG. 1 illustrates a single server 103 for the host computing system 102, environment 100 can be implemented using two or more servers 103, as well as computers other than servers, including a server pool. Indeed, server 103 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 103 may be adapted to execute any operating system, including Linux, UNIX, Windows, Mac OS, or any other suitable operating system.

The illustrated server 103 also includes an interface 117, a processor 118, and a memory 120. The interface 117 is used by the server 103 for communicating with other systems in a distributed environment—including within the environment 100—connected to the network 115; for example, the enterprise computing device 125 and the partner computing device 127, as well as other systems communicably coupled to the network 115. Generally, the interface 117 includes logic encoded in software and/or hardware in a suitable combination and operable to communicate with the network 115. More specifically, each interface 117 may include software supporting one or more communication protocols associated with communications such that the network 115 or interface's hardware is operable to communicate physical signals within and outside of the illustrated environment 100.

As illustrated in FIG. 1, the server 103 includes the processor 118. Although illustrated as a single processor 118 in FIG. 1, two or more processors may be used according to particular needs, desires, or particular embodiments of the environment 100. The processor 118 may be a central processing unit (CPU), a blade, an application specific integrated circuit (ASIC), a field-programmable gate array (FPGA), or another suitable component. Generally, the processor 118 executes instructions and manipulates data to perform the operations of the server 103. For example, the processor 118 executes the functionality required to receive and respond to requests from the enterprise computing system 125, and/or the partner computing system 127.

Regardless of the particular implementation, "software" may include computer-readable instructions, firmware, wired or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java, Visual Basic, assembler, Perl, any suitable version of 4GL, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

The server 103 also includes a memory 120, or multiple memories 120. The memory 120 may include any memory or database module and may take the form of volatile or non-volatile memory including, without limitation, magnetic media, optical media, random access memory (RAM), read-only memory (ROM), removable media, or any other suitable local or remote memory component. The memory 120 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the host computing system 102. Additionally, the memory 120 may include any other appropriate data, such as VPN applications, firmware logs and policies, firewall policies, a security or access log, print or other reporting files, as well as others.

In some embodiments, the enterprise computing system 125 can include similar (or identical) components as that of the host computing system 102. For example, the enterprise computing system 125 can include any combination (including each) of the interface 117, the processor 118, the mapping proxy module 104, and the memory 120. Additionally, the enterprise computing system 125 can implement any of the methods and functionality of the host computing system 102, either alone, or in cooperation/coordination with the host computing system 102.

Additionally, in some embodiments, the illustrated partner computing system 127 includes a processor 140, an interface 145, and a memory 170. The processor 140, the interface 145, and the memory 170 can be analogous to that of the processor 118, the interface 117, and the memory 120, respectively, of the host computing system 102. Specifically, the processor 140, the interface 145, and the memory 170 can include similar (or substantially the same) functionality as that of the processor 118, the interface 117, and the memory 120, respectively, of the host computing system 102.

Furthermore, the memory 120 of the host computing system 102 can further include the mapping interface(s) 150, messages 155, and port connections 160; and the memory 170 of the partner computing system 127 can include messages 175. The messages 155 and 175 can include the application requests, responses, and faults, described further below. In some examples, the messages 175 can be independent of or dependent on (based on) the messages 155. In some embodiments, the messages 175 are responses to the messages 155. In some embodiments, the messages 175 are faults relating to the messages 155. The mapping interface(s) 150 are mappings between the messages 155 associated with the application 121 of the host computing system 102 and the messages 175 associated with the application 123 of the partner computing system 127, described further below. The port connections 160 facilitate connections between the applications 121 and 123 (e.g., the web services). In some implementations, the mapping interface(s) 150, the messages 155 and 175, and the port connections 160 can be stored by a third party that provides networked online storage.

In some embodiments, the host computing system 102, the partner computing system 127, or both, may include a computer that includes an input device, such as a keypad, touch screen, mouse, or other device that can accept user information, and an output device that conveys information associated with the operation of the computing systems 102, 127, including digital data, visual information, or a graphic user interface (GUI). The input and output device may include fixed or removable storage media such as a magnetic storage media, CD-ROM, or other suitable media to both receive input from and provide output to users of the computing system 102, 127 through the GUI.

The GUI provides an interface to at least a portion of the environment 100 for any suitable purpose, including generating a visual representation of a web browser. Generally, through the GUI, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI can represent any graphical user interface, including but not limited to, a web browser, touch screen, or command line interface (CLI) that processes information in the environment 100 and efficiently presents the information results to the user. In general, the GUI may include one or more user interface (UI) elements, some or all associated with a web browser, such as interactive fields, pull-down lists, and buttons operable by the user at the computing systems 102, 127. These and other UI elements may be related to or represent the functions of the web browser. In particular, the GUI may be used to view and navigate various web pages located both internal and external to the server.

The environment 100 further includes a repository 130. In some embodiments, the repository 130 is an in-memory repository. The repository 130 can be a cloud-based storage medium. For example, the repository 130 can be networked online storage where data is stored on virtualized pools of storage.

With respect to the network 115, generally, the network 115 facilitates wireless or wireline communications between the components of the environment 100 (i.e., between the computing systems 102, 127), as well as with any other local or remote computer, such as additional clients, servers, or other devices communicably coupled to network 115 but not illustrated in FIG. 1. The network 115 is illustrated as a single network in FIG. 1, but may be a continuous or discontinuous network without departing from the scope of this disclosure, so long as at least a portion of the network 115 may facilitate communications between senders and recipients. The network 115 may be all or a portion of an enterprise or secured network, while in another instance at least a portion of the network 115 may represent a connection to the Internet.

In some instances, a portion of the network 115 may be a virtual private network (VPN), such as, for example, the connection between the computing systems 102, 125. Further, all or a portion of the network 115 can comprise either a wireline or wireless link. Example wireless links may include 802.11a/b/g/n, 802.20, WiMax, and/or any other appropriate wireless link. In other words, the network 115 encompasses any internal or external network, networks, sub-network, or combination thereof operable to facilitate communications between various computing components inside and outside the illustrated environment 100. The network 115 may communicate, for example, Internet Protocol (IP) packets, Frame Relay frames, Asynchronous Transfer Mode (ATM) cells, voice, video, data, and other suitable information between network addresses. The network 115 may also include one or more local area networks (LANs), radio access networks (RANs), metropolitan area networks (MANs), wide area networks (WANs), all or a portion of the Internet, and/or any other communication system or systems at one or more locations.

To that end, in some examples, the messages 155 and 175 can be mapped. Specifically, in some embodiments, the message 155 is received from the application 121 (e.g., a first web service). The message 150 includes one or more operations in a first format. The mapping interface 150 is identified that is based on the application 121 (e.g., the first web service). The mapping interface 150 includes one or more mappings for each of the operations of the message 155. In some examples, the mappings for each of the operations include asynchronous mappings, synchronous mappings, or both. The application 123 (e.g., a second web service) is identified that is associated with the identified mapping interface 150. The received message 155 (from the application 121) is mapped to the application 123 (e.g., the second web service) such that the operations (of the message 155) are in a second format associated with the application 123 (e.g., the second web service). A logical port connection 160 is assigned to (or associated with) the application 123 (e.g., the second web service).

Specifically, the message 150 from the application 121 (e.g., the first web service) is received. In some examples, the application 121 can transmit the message 150 in response to a request. In some examples, the application 121 can transmit to the message 150 independent of a request. The application 121 can retrieve the message 155 (for subsequent transmission) from the memory 120. However, in some examples, the message 155 can be retrieved from any memory storing the message 155, such as the repository 130. In some embodiments, the mapping proxy module 104 receives the message 150 from the application 121 (and in some examples, also requests the message 150).

The message 155 can include one or more operations. The operations can be asynchronous operations, synchronous operations, or both. In summary, with respect to the synchronous operation, a response and/or a fault may be received in response to the message including the synchronous operation, while with respect to the asynchronous operation, a response and/or fault is not received in response to the message including the asynchronous operation. Furthermore, the message 155, and the operations included by the message 155, can be in a first format associated with the application 121 (and/or a format of the host computing system 102).

In some embodiments, two or more messages 155 can be received. In some embodiments, two or more messages 155 are received in a sequence (e.g., in a numbered order). In some examples, each of the messages 155 can be associated with an identification (ID) number. Associating an ID number with each of the messages 155 can facilitate mapping the messages 155 in a similar (or same) order as the messages 155 were received, described further below. In some embodiments, the mapping proxy module 104 receives the two or more messages 150 from the application 121 (and in some examples, receives the two or more messages 150 in the sequence).

In some embodiments, the message 155 includes extensible markup language (XML) data. For example, the operations of the message 155 can include XML data.

A mapping interface 150 is identified. In some examples, the mapping interface 150 is identified in response to receiving the message 150. In some examples, the mapping interface 150 is identified independent to receiving the message 150. In some examples, more than one mapping interface can be identified. Identification of the mapping interface 150 can be based on the application 121 (e.g., the first web service), the formatting associated with the application 121, the message 155, the formatting of the message 155, the operations associated with the message 155, the formatting of the operations associated with the message 155, or any combination thereof. In some embodiments, the mapping proxy module 104 identifies the mapping interface 150.

The mapping interface 150 includes (or provides) mappings for each of the operations associated with the message 155. Specifically, the mappings for each of the operations associated with the message 155 include mappings from a formatting type (or style) of the application 121 (e.g., the first web service). In some examples, more than one mapping can be provided (or identified) for one or more of the operations associated with the message 155.

In some embodiments, the mappings for the operations associated with the message 155 can include asynchronous mapping, synchronous mappings, or both. For example, when the message 155 includes an asynchronous operation, the asynchronous operation can be associated with an asynchronous mapping; and when the message 155 includes a synchronous operation, the synchronous operation can be associated with a synchronous mapping.

The application 123 (e.g., the second web service) is identified that is associated with (or assigned to) the identified mapping interface 150. Specifically, each of the mapping interfaces 150 (stored by the memory 120) can be associated with a second web service (e.g., the application 123). To that end, in response to identifying the mapping interface 150 based on the application 121 (e.g., the first web service), the application 123 (e.g., the second web service) is identified that is associated with the identified mapping interface 150. In some examples, the application 123 (e.g., the second web service) can be identified based on metadata associated with the identified mapping interface 150. In some embodiments, the mapping proxy module 104 identifies the application 123 (e.g., the second web service) that is associated with the identified mapping service 150.

In some embodiments, one or more of the mapping interfaces 150 are associated with two or more second web services (e.g., two or more applications analogous to the application 123). Thus, two or more web services (e.g., two or more applications analogous to the application 123) can be identified.

In some examples, the second web service (e.g., the application 123) is identified based on the types of mappings of the identified mapping interface 150. For example, when the message 155 includes an asynchronous operation (or a synchronous operation, or both), the mapping interface 150 can include at least an asynchronous mapping (or a synchronous mapping, or both), and further, the application 123 (e.g., the second web service) is identified based on the asynchronous mapping (or synchronous mapping, or both) of the asynchronous operation (or synchronous operation, or both).

The message 155 is mapped to the application 123 (e.g., the second web service) such that the operations of the message 155 are in a second format associated with the application 123 (e.g., the second web service). Specifically, the application 123 (e.g., the second web service) can be associated with (or include) a second formatting that differs from the formatting associated with (or included by) the application 121 (e.g., the first web service). As mentioned above, the operations of the as-received message 155 can be in the first format associated with the application 121 (and/or a format of the host computing system 102). However, after mapping the message 155 to the application 123 (e.g., the second web service), the operations of the message 155 are in the second format associated with the application 123 (e.g., the second web service) (and/or a format of the partner computing system 127). In some embodiments, the mapping proxy module 104 maps the messages 155 to the application 123 (e.g., the second web service).

Mapping of the message 155 to the application 123 (e.g., the second web service) can include employing the identified mapping interface 150 (that is based on the application 121 (e.g., the first web service)) such that the operations of the received message 155 are mapped from the first format (of the application 121) to the second format (of the application 123) according to the mappings of the identified mapping interface 150. Specifically, when an operation of the message 155 includes an asynchronous operation (or synchronous operation), an asynchronous mapping (or synchronous mapping) of the identified mapping interface 150 is employed to map the asynchronous operation (or synchronous operation) from the first format (of the application 121) to the second format (of the application 123) such that the asynchronous operation (or synchronous operation) of the message 155 can be interpreted by, employed by, or otherwise interacted with by the application 123 (e.g., the second web service).

In some examples, mapping the message 155 to the application 123 (e.g., the second web service) can include mapping the message 155 to multiple second web services (e.g., multiple applications each analogous to the application 123). In some examples, mapping the message 155 can include mapping multiple messages 155 to the application 123 (e.g., the second web service). In some examples, mapping the multiple messages 155 can include mapping the messages 155 in the sequence for which the messages 155 were received. Specifically, as mentioned above, the messages 155 can have an associated ID number representing the sequence for which each particular message 155 was received. To that end, the messages 155 can be mapped to the application 123 (e.g., the second web service) with respect to the associated ID numbers of the messages 155. In some examples, the messages 155 are mapped in a differing sequence for which the messages were received.

In some embodiments, mapping the message 155 to the application 123 (e.g., the second web service) can include splitting the message 155 into two or more messages 155. Specifically, splitting the message 155 into two or more messages 155 can be performed based on the application 123 (e.g., the second web service), and particularly, the UI associated with the application 123 (how the data related to the message 155 is presented to the user (e.g., the formatting of the application 123)). In some examples, the message 155 is split when the message 155 includes asynchronous operations. In some examples, the message 155 can split into two or more messages 155 based on a size (e.g., data size) of the message 155. For example, the message 155 can be split such that each split message 155 is of similar (or the same) data size, or the message 155 can be split based on the application 123 (e.g., the second web service) (what data size the application 123 is able to process for each message 155). In some embodiments, the mapping proxy module 104 splits the messages 155 into two or more split messages 155.

In some embodiments, the split messages 155 can be mapped to second web services (e.g., the application 123 or analogous applications). Specifically, the messages 155 can be mapped to the second web services (e.g., the application 123 or analogous applications) such that the operations of each split message 155 are in a format associated with the second web service (e.g., the application 123 or analogous applications) that the respective split message 155 is mapped to, analogous to that mentioned above with respect to the message 155. In some embodiments, the mapping proxy module 104 maps the split messages 155 to the second web services (e.g., the application 123 or analogous applications).

In some examples, each of the split messages 155 or a subset of the split messages 155 are mapped to second web services (e.g., the application 123 or analogous applications). In some examples, each of the split messages 155 (or a subset of the split messages 155) are mapped to differing (or the same) second web services (e.g., the application 123 or analogous applications).

A logical port connection 160 is assigned to the application 123 (e.g., the second web service). Specifically, upon mapping (or in response to mapping) the message 155 from the first format of the application 121 (e.g., the first web service) to the second format of application 123 (e.g., the second web service) via the mappings of the identified mapping interface 150, a logical port connection 160 (stored by the memory 120) is associated with the application 123 (or provided between the application 123 and the application 121). The logical port connection 160 establishes a connection between the application 121 (e.g., the first web service) and the application 123 (e.g., the second web service) such that the message 155 (or the split messages 155) are provided to the application 123 (e.g., the second web service) such that the message 155 can be interpreted by, employed by, or otherwise interacted with by the application 123 (e.g., the second web service). In some embodiments, the mapping proxy module 104 assigns the logical port connection 160 to the application 123 (e.g., the second web service).

In some examples, when multiple messages 155 are received (or the message 155 is split into split messages 155), and a subset of the multiple messages (or the split messages 155) are mapped to multiple second web services (e.g., the application 123 or analogous applications), a logical port connection 160 is assigned to each of the multiple second web services (e.g., the application 123 or analogous applications).

In some additional embodiments, the message 155 is stored (e.g., the received message 155). For example, the message 155 can be stored by any combination of the memory 120 of the host computing system 102, the memory 170 of the partner computing system 127, or the repository 130. In some examples, the message 155 is stored as a result of the message 155 including one or more asynchronous operations. In some examples, the message 155 is stored in response to receiving the message 155, or stored independent to receiving (or transmitting) the message 155. In some examples, the message 155 is stored after mapping the message 155 to the application 123 (e.g., the second web service). In some examples, the mapped message 155 (i.e., after mapping the message 155 to the application 123 (e.g., the second web service)) is stored. In some examples, the split messages 155 are stored. In some embodiments, the mapping proxy module 104 facilitates storing the message 155.

In some additional embodiments, after providing (or in response to providing) the message 155 to the second application 123 (e.g., the second web service), as mentioned above, a response to the message 155 can be provided (or generated) by the second application 123. In particular, when the message 155 includes one or more synchronous operations, the synchronous operations are mapped using synchronous mappings of the identified mapping interface 150. When the synchronous operations of the message 155 are provided to the second application 123 (e.g., the second web service) in the format of the second application 123, the second application 123 can provide a response, a fault, or both based on (related to) the message 155, described further below.

Specifically, analogous to that mentioned above with respect to receiving the message 155, an (additional) message 175 is received related to the message 155. The application 123 can retrieve the message 175 from the memory 170. However, in some examples, the message 175 can be retrieved from any memory storing the message 175, such as the repository 130. In some embodiments, the mapping proxy module 104 receives the message 175 from the application 123 (and in some examples, also requests the message 175). Similar to that of message 155, the message 175 can include one or more (additional) operations. The operations can be asynchronous operations, synchronous operations, or both. Furthermore, the message 175, and the operations included by the message 175, can be in the second format associated with the application 123 (and/or a format of the partner computing system 127). In some embodiments, the mapping proxy module 104 receives the message 175.

In some embodiments, the (additional) message 175 is a response to the message 155. Specifically, upon reception of the message 155 by the second application 123 (e.g., the second web service), the second application 123 can provide the message 175 as a response to the message 155 (that was mapped to the second application 123). In some examples, the message 175 is a fault. Specifically, when the second application 123 is unable to process the mapped message 155 (e.g., the mapped message 155 is not available in the second application 123, or a response to the mapped message 155 is not available), the message 175 includes a fault. In some examples, the additional message 175 is received after providing the message 155 (to the application 123).

Analogous to that mentioned above with respect to identifying the mapping interface 150, an additional mapping interface 150 is identified based on the second application 123 (e.g., the second web service). The additional mapping interface 150 includes (or provides) mappings for each of the (additional) operations associated with the (additional) message 175. Specifically, the mappings for each of the operations associated with the message 175 include mappings from a formatting type (or style) of the application 123 (e.g., the second web service). In some embodiments, the mappings for the (additional) operations associated with the additional message 175 can include asynchronous mapping, synchronous mappings, or both. In some embodiments, the mapping proxy module 104 identifies the additional mapping interface 150.

Analogous to that mentioned above with respect to identifying the first second web service, the application 121 (e.g., the first web service) is identified that is associated with (or assigned to) the identified additional mapping interface 150. In response to identifying the additional mapping interface 150 based on the second web service (e.g., the application 123), the first web service (e.g., the application 121) is identified that is associated with the identified additional mapping interface 150. In some embodiments, the mapping proxy module 104 identifies the application 121 (e.g., the first web service) that is associated with the identified mapping service 150.

Analogous to that mentioned above with respect to mapping the message 155, the (additional) message 175 is mapped to the first web service (e.g., the application 121) such that the operations of the message 175 are in the format associated with the first web service (e.g., the application 121). After mapping the application 121 (e.g., the first web service), the operations of the message are in the first format associated with the application 121 (e.g., the first web service) (and/or a format of the host computing system 102). In some embodiments, the mapping proxy module 104 maps the messages 175 to the application 121 (e.g., the first web service).

Mapping of the (additional) message 175 to the application 121 (e.g., the first web service) can include employing the identified additional mapping interface 150 (that is based on the application 123 (e.g., the second web service)) such that the operations of the message 175 are mapped from the second format (of the application 123) to the first format (of the application 121) according to the mappings of the identified additional mapping interface 150. Specifically, when an operation of the message 175 includes an asynchronous operation (or synchronous operation), an asynchronous mapping (or synchronous mapping) of the identified additional mapping interface 170 is employed to map the asynchronous operation (or synchronous operation) from the second format (of the application 123) to the first format (of the application 121) such that the asynchronous operation (or synchronous operation) of the message 175 (can be interpreted by, employed by, or otherwise interacted with by the application 121 (e.g., the first web service).

Analogous to that mentioned above with respect to assigning the logical port connection to the application 123, an additional logical port connection 160 is assigned to the application 121 (e.g., the first web service). Specifically, upon mapping (or in response to mapping) the (additional) message 175 from the second format of the application 123 (e.g., the second web service) to the first format of application 121 (e.g., the first web service) via the mappings of the identified additional mapping interface 150, an additional logical port connection 160 is associated with the application 121 (or provided between the application 121 and the application 123). The additional logical port connection 160 establishes a connection between the application 123 (e.g., the second web service) and the application 121 (e.g., the first web service) such that the message 175 is provided to the application 121 (e.g., the first web service) such that the message 175 can be interpreted by, employed by, or otherwise interacted with by the application 121 (e.g., the first web service). In some embodiments, the mapping proxy module 104 assigns the additional logical port connection 160 to the application 121 (e.g., the first web service).

Figure 2A:
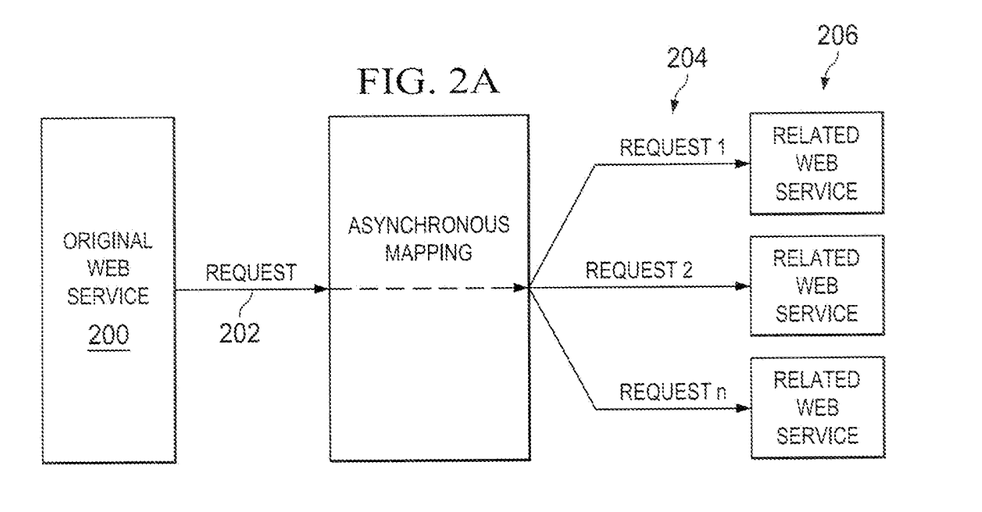
FIGS. 2A and 2B illustrate example mapping of messages between web services.
Figure 2B:
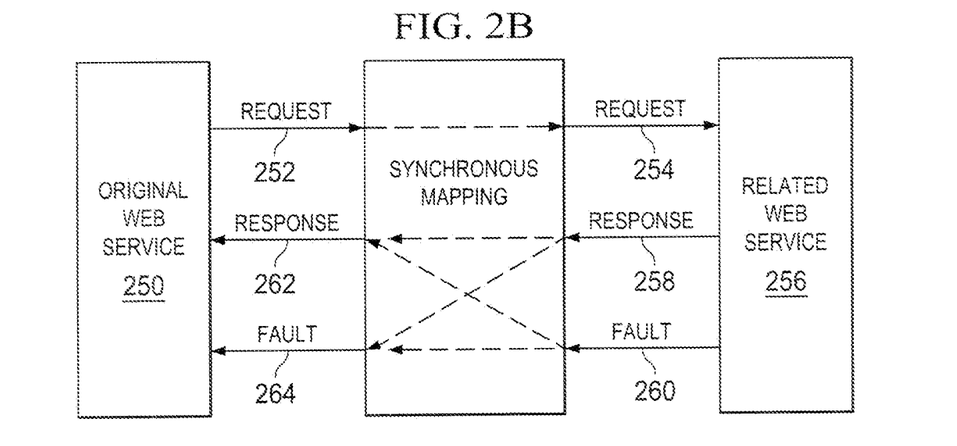

FIGS. 2A and 2B illustrate example mapping of messages between web services. Specifically, FIG. 2A illustrates asynchronous mapping of messages between web services and FIG. 2B illustrates synchronous mapping of messages between the web services. With respect to FIG. 2A, a first web service 200 (such as the application 121) sends a request 202 (the message) that is asynchronously mapped to one or more requests 204 (such as by splitting the request 204 into two or more requests), employing the method mentioned above. The one or more requests 202 are each then provided to one or more second web services 206 (such as the application 123). The asynchronous mapping of the request 202 to the one or more request 204 can be done via the mapping proxy module 104 employing the mapping interface 150.

With respect to FIG. 2B, similar to that mentioned above, a first web service 250 (such as the application 121) sends a request 252 (the message) that is synchronously mapped to a request 254, employing the method mentioned above. The request 254 is provided to the second web service 256 (such as the application 123). The second web service 256 can provide a response 258, a fault 260, or both, that is synchronously mapped to a response 262, a fault 264, or both. As mentioned above, the fault 260 (or fault 264) results when the second web service 256 (or the first web service 250) being unable to process the request 254 (or the response 258).

Figure 3:
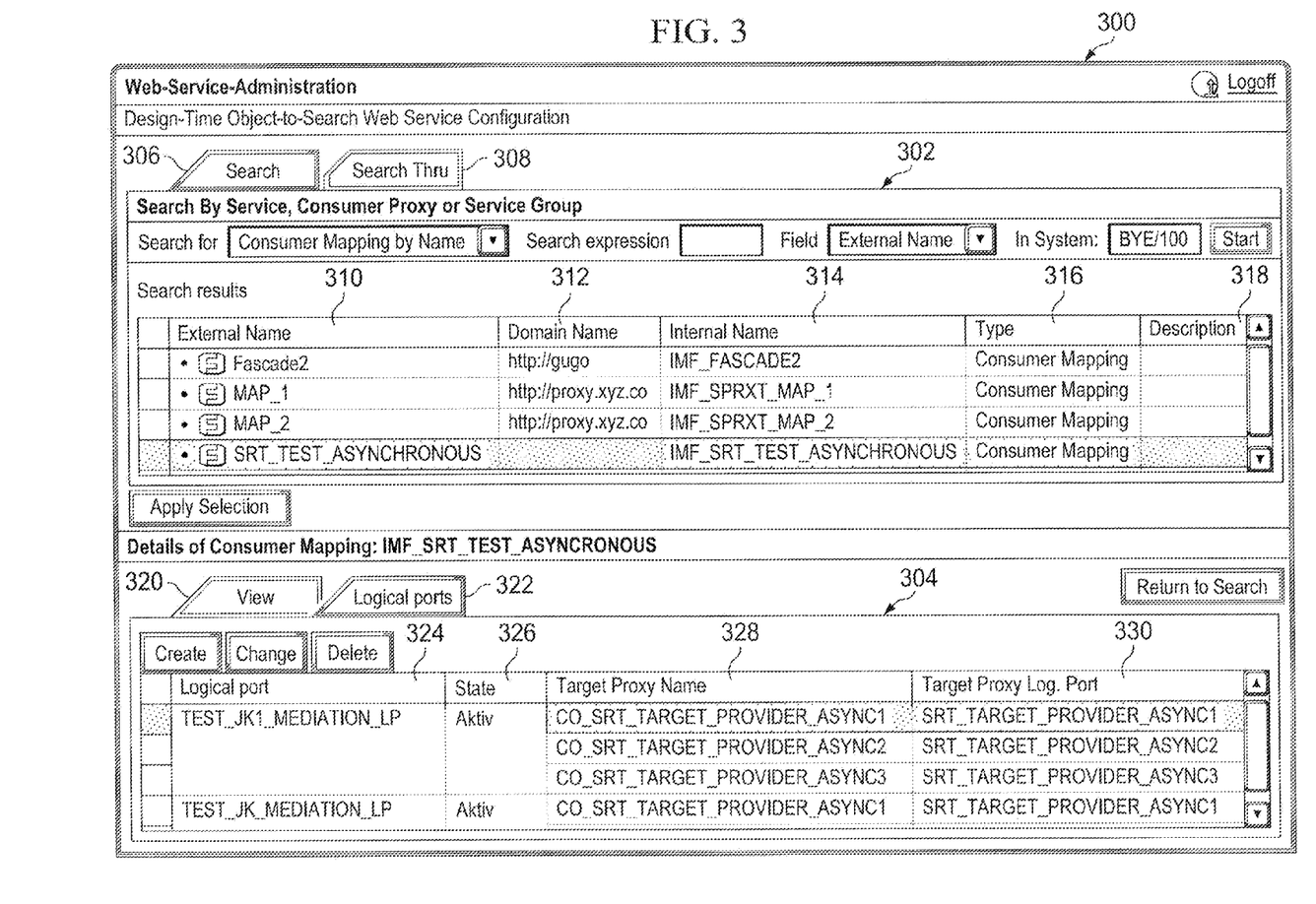
FIG. 3 illustrates an example graphical user interface (GUI) for mapping of messages.

FIG. 3 illustrates an example graphical user interface (GUI) 300 for mapping of messages. In some examples, the GUI 300 can be a graphical interpretation of the mapping proxy module 104. Specifically, the GUI 300 allows searching of mapping interfaces (e.g., the mapping interface 150) via a name of the mapping interface or via a name of the referred source consumer proxy (e.g., the host computing system 102 or the partner computing system 127). The GUI 300 includes an overview section 302 and a logical port section 304. The overview section 302 provides an overview about the mapping interfaces and configured mediation logical ports (e.g., the mapping proxy module 104). The logical port section 304 allows creating and maintaining the mediation logical port.

The configuration section 302 includes a search tab 306 and a search thru tab 308. The search tab 306 includes an interface for searching for mapping interfaces (e.g., the mapping interface 150) by service, consumer proxy, or service group. For example, based on the application 121 or 123, mapping interfaces 150 are identified, including an external name 310, a domain name 312, an internal name 314, a type 316, and a description 318. The logical port section 304 includes a view tab 320, and a logical ports tab 322. For each logical port, the logical ports tab 322 includes a logical port name 324, a state 326, a target proxy name 328 (e.g., the application 121 or 123), and a target proxy logical port 330 (e.g., the port connection 160).

Figure 4A:
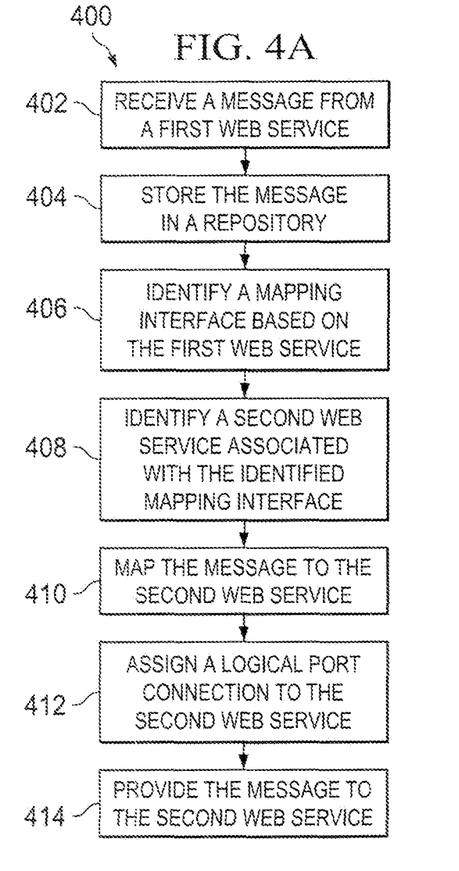
FIGS. 4A-4D illustrate example methods for mapping messages.

FIG. 4A illustrates an example method for mapping messages. The example method 400 can be executed, for example, by the mapping proxy module 104 using one or more computing devices. For example, any combination of the computing systems 102, 125 can be used to execute the example process 400 and obtain any data from the memory of the computing systems 102, 125, and/or the repository 130.

In step 402, a message is received from a first web service. The message includes one or more operations in a first format. For example, the mapping proxy module 104 receives the message 155 from the application 121 (e.g., the first web service). In some examples, the message 155 can include one or more operations. The operations can be asynchronous operations, synchronous operations, or both. In summary, with respect to the synchronous operation, a response and/or a fault may be received in response to the message including the synchronous operation, while with respect to the asynchronous operation, a response and/or fault is not received in response to the message including the asynchronous operation. Furthermore, the message 155, and the operations included by the message 155, can be in a first format associated with the application 121 (and/or a format of the host computing system 102.

In some examples, the message is a XML message. For example, the message 155 includes XML data, the operations of the message 155 include XML data, or both.

In step 404, the message is optionally stored in a repository. In some examples, the message is stored in the repository prior to mapping the message. For example, the mapping proxy module 104 facilitates storing the message 155 in the repository 130 when the message 155 includes one or more asynchronous operations. In some examples, the message 155 is stored as a result of the message 155 including one or more asynchronous operations.

In step 406, a mapping interface is identified that is based on the first web service. The mapping interface includes one or more mappings for each of the operations of the message. For example, the mapping proxy module 104 identifies the mapping interface 150 that is based on the application 121 (e.g., the first web service). Identification of the mapping interface 150 can be based on the application 121 (e.g., the first web service). The mapping interface 150 includes (or provides) mappings for each of the operations associated with the message 155. Specifically, the mappings for each of the operations associated with the message 155 include mappings from a formatting type (or style) of the application 121 (e.g., the first web service).

In some examples, the one or more mappings for each of the operations include asynchronous mappings, synchronous mappings, or both. For example, when the message 155 includes an asynchronous operation, the asynchronous operation can be associated with an asynchronous mapping; and when the message 155 includes a synchronous operation, the synchronous operation can be associated with a synchronous mapping.

In step 408, a second web service is identified that is associated with the identified mapping interface. For example, the mapping proxy module 104 identifies the application 123 (e.g., the second web service) that is associated with the identified mapping interface 150. In some examples, each of the mapping interfaces 150 can be associated with a second web service (e.g., the application 123). To that end, in response to identifying the mapping interface 150 based on the application 121 (e.g., the first web service), the second web service (e.g., the application 123) is identified that is associated with the identified mapping interface 150.

In step 410, the message is mapped to the second web service such that the one or more operations are in a second format associated with the second web service. For example, the mapping proxy module maps the message 155 to the application 123 (e.g., the second web service) such that the operations (of the messages 155) are in a second format associated with the application 123 (e.g., the second web service). In some examples, the application 123 (e.g., the second web service) can be associated with (or include) a second formatting that differs from the formatting associated with (or included by) the application 121 (e.g., the first web service). As mentioned above, the operations of the as-received message 155 can be in the first format associated with the application 121. However, after mapping the application 123 (e.g., the second web service), the operations of the message are in the second format associated with the application 123 (e.g., the second web service).

In some examples, mapping of the message 155 to the application 123 (e.g., the second web service) can include employing the identified mapping interface 150 (that is based on the application 121 (e.g., the first web service)) such that the operations of the received message 155 are mapped from the first format (of the application 121) to the second format (of the application 123) according to the mappings of the identified mapping interface 150. Specifically, when an operation of the message 155 includes an asynchronous operation (or synchronous operation), an asynchronous mapping (or synchronous mapping) of the identified mapping interface 150 is employed to map the asynchronous operation (or synchronous operation) from the first format (of the application 121) to the second format (of the application 123) such that the asynchronous operation (or synchronous operation) of the message 155 can be interpreted by, employed by, or otherwise interacted with by the application 123 (e.g., the second web service).

In step 412, a logical port connection is assigned to the second web service. For example, the mapping proxy module assigns the logical port connection 160 to the second application 123 (e.g., the second web service). In some examples, a logical port connection 160 (stored by the memory 120) is associated with the application 123 (or provided between the application 123 and the application 121).

In step 414, the mapped message is provided to the second web service. For example, the logical port connection 160 facilitates providing the mapped message 160 to the application 123 (e.g., the second web service). The logical port connection 160 establishes a connection between the application 121 (e.g., the first web service) and the application 123 (e.g., the second web service) such that the message 155 (or the split messages 155) are provided to the application 123 (e.g., the second web service) such that the message 155 can be interpreted by, employed by, or otherwise interacted with by the application 123 (e.g., the second web service).

Figure 4B:
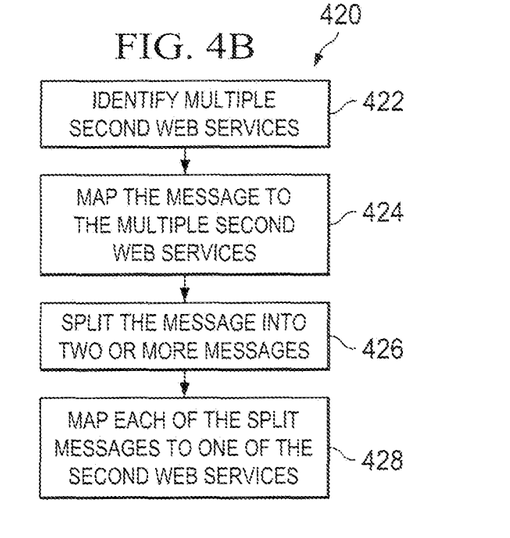

FIG. 4B illustrates an example method for mapping multiple messages. The example method 420 can be executed, for example, by the mapping proxy module 104 using one or more computing devices. For example, any combination of the computing systems 102, 125, can be used to execute the example process 420 and obtain any data from the memory of the computing systems 102, 125, and/or the repository 130.

In step 422, multiple second web services are identified. For example, the mapping proxy module 104 identifies multiple applications (e.g., the application 123 and analogous applications). In some examples, one or more of the mapping interfaces 150 are associated with two or more second web services (e.g., two or more applications analogous to the application 123).

In step 424, the message is mapped to the multiple second web services. For example, the mapping proxy module 104 maps the message 155 to the multiple applications (e.g., the application 123 and analogous applications). In some examples, mapping the message 155 to the application 123 (e.g., the second web service) can include mapping the message 155 to multiple second web services (e.g., each analogous to the application 123). In some examples, mapping the message 155 can include mapping multiple messages 155 to the application 123 (e.g., the second web service).

In step 426, the message is split into two or more messages. For example, the mapping proxy module 104 splits the message 155 into two or more split messages 155. In some examples, splitting the message 155 into two or more messages 155 can be performed based on the application 123 (e.g., the second web service), and particularly, the UI associated with the application 123 (how the data related to the message 155 is presented to the user (e.g., the formatting of the application 123)). In some examples, the message 155 is split when the message 155 includes asynchronous operations.

In step 428, each of the split messages is mapped to one of the second web services such that the operations of each split message are in a format associated with the respective second web service. For example, the mapping proxy module 104 maps the split messages 155 to the multiple applications (e.g., the application 123 and analogous applications). In some examples, the messages 155 can be mapped to the second web services (e.g., the application 123 or analogous applications) such that the operations of each split message 155 are in a format associated with the second web service (e.g., the application 123 or analogous applications) that the respective split message 155 is mapped to.

Figure 4C:
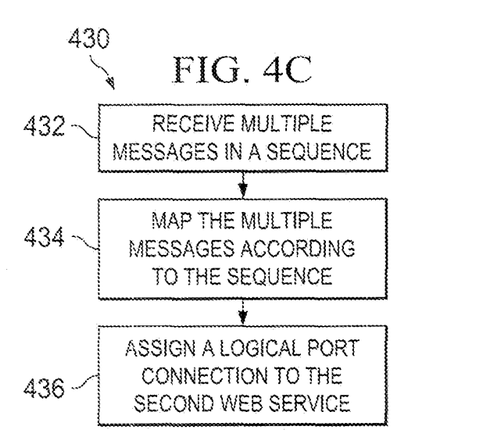

FIG. 4C illustrates an example method for mapping multiple messages in a sequence. The example method 430 can be executed, for example, by the mapping proxy module 104 using one or more computing devices. For example, any combination of the computing systems 102, 125 can be used to execute the example process 430 and obtain any data from the memory of the computing systems 102, 125, and/or the repository 130.

In step 432, multiple messages are received in a sequence. For example, the mapping proxy module 104 receives the multiples messages 155 in a sequence. In some examples, each of the messages 155 can be associated with an identification (ID) number. Associating an ID number with each of the messages 155 can facilitate mapping the messages 155 in a similar (or same) order as the messages 155 were received, described further below.

In step 434, the multiple messages are mapped according to the sequence. For example, the mapping proxy module 104 maps the multiple messages 155 according to the sequence. In some examples, the messages 155 can be mapped to the application 123 (e.g., the second web service) with respect to the associated ID numbers of the messages 155. In some examples, the messages 155 are mapped in a differing sequence for which the messages were received.

In step 436, a logical port connection is assigned to the second web service. For example, the mapping proxy module assigns the logical port connection 160 to the second application 123 (e.g., the second web service). In some examples, a logical port connection 160 (stored by the memory 120) is associated with the application 123 (or provided between the application 123 and the application 121).

Figure 4D:
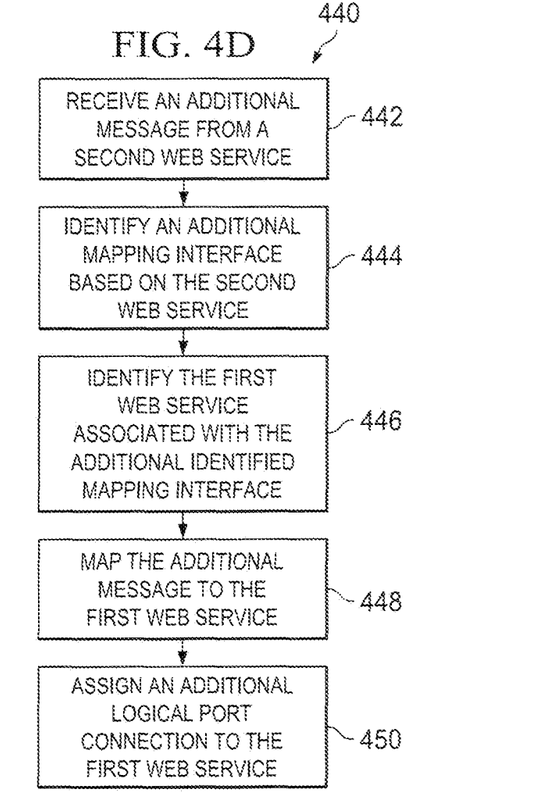

FIG. 4D illustrates an example method for mapping messages that are in response to a received message. The example method 440 can be executed, for example, by the mapping proxy module 104 using one or more computing devices. For example, any combination of the computing systems 102, 125 can be used to execute the example process 440 and obtain any data from the memory of the computing systems 102, 125, and/or the repository 130.

In step 442, an additional message is received that is related to the mapped message. The additional message includes one or more additional operations in the second format. For example, the mapping proxy module 104 receives the additional message. In some examples, the mapping proxy module 104 receives the message 175 from the application 123. The message 175 can include one or more (additional) operations. The operations can be asynchronous operations, synchronous operations, or both. Furthermore, the message 175, and the operations included by the message 175, can be in the second format associated with the application 123.

In some examples, the additional message is a response to the mapped message, a fault related to the mapped message, or both. In some examples, upon reception of the message 155 by the second application 123 (e.g., the second web service), the second application 123 can provide the message 175 as a response to the message 155 (that was mapped to the second application 123). In some examples, the message 175 is a fault. Specifically, when the second application 123 is unable to process the mapped message 155 (e.g., the mapped message 155 is not available in the second application 123, or a response to the mapped message 155 is not available), the message 175 includes a fault.

In step 444, an additional mapping interface is identified that is based on the second web service. The additional mapping interface includes one or more mappings for each of the additional operations of the additional message. For example, the mapping proxy module 104 identifies the additional mapping interface 150 based on the application 123 (e.g., the second web service). In some examples, the additional mapping interface 150 includes (or provides) mappings for each of the (additional) operations associated with the (additional) message 175. Specifically, the mappings for each of the operations associated with the message 175 include mappings from a formatting type (or style) of the application 123 (e.g., the second web service). In some embodiments, the mappings for the (additional) operations associated with the additional message 175 can include asynchronous mapping, synchronous mappings, or both.

In step 446, the first web service is identified that is associated with the additional mapping interface. For example, the mapping proxy module 104 identifies the application 121 (e.g., the first web service) that is associated with the additional mapping interface 140. In some examples, in response to identifying the additional mapping interface 150 based on the application 123 (e.g., the second web service), the application 121 (e.g., the first web service) is identified that is associated with the identified additional mapping interface 150.

In step 448, the additional message is mapped to the first web service such that the one or more additional operations are in the first format are associated with the first web service. For example, the mapping proxy module 104 maps the additional message 155 to the application 121 (e.g., the first web service). In some examples, after mapping the application 121 (e.g., the first web service), the operations of the message are in the first format associated with the application 121 (e.g., the first web service) (and/or a format of the host computing system 102).

In some examples, mapping of the additional message 175 to the application 121 (e.g., the first web service) can include employing the identified additional mapping interface 150 (that is based on the application 123 (e.g., the second web service)) such that the operations of the additional message 175 are mapped from the second format (of the application 123) to the first format (of the application 121) according to the mappings of the identified additional mapping interface 150. Specifically, when an operation of the additional message 175 includes an asynchronous operation (or synchronous operation), an asynchronous mapping (or synchronous mapping) of the identified additional mapping interface 170 is employed to map the asynchronous operation (or synchronous operation) from the second format (of the application 123) to the first format (of the application 121) such that the asynchronous operation (or synchronous operation) of the additional message 175 (or the additional message 175) can be interpreted by, employed by, or otherwise interacted with by the application 121 (e.g., the first web service).

In step 450, an additional logical port connection is assigned to the first web service. For example, the mapping proxy module 104 assigns an additional logical port connection 160 to the application 121 (e.g., the first web service). In some examples, upon mapping (or in response to mapping) the additional message 175 from the second format of the application 123 (e.g., the second web service) to the first format of application 121 (e.g., the first web service) via the mappings of the identified additional mapping interface 150, an additional logical port connection 160 is associated with the application 121 (or provided between the application 121 and the application 123). The additional logical port connection 160 establishes a connection between the application 123 (e.g., the second web service) and the application 121 (e.g., the first web service) such that the additional message 175 is provided to the application 121 (e.g., the first web service) such that the additional message 175 can be interpreted by, employed by, or otherwise interacted with by the application 121 (e.g., the first web service).

A number of implementations have been described. Nevertheless, it will be understood that various modifications may be made. For example, other methods described herein besides or in addition to that illustrated in, or described with reference to, FIGS. 1-4 may be performed. Further, the illustrated steps of methods 400, 420, 430, and 440 may be performed in different orders, either concurrently or serially. Further, steps may be performed in addition to those illustrated in methods 400, 420, 430, and 440, and some steps illustrated in methods 400, 420, 430, and 440 may be omitted without deviating from the present disclosure. Accordingly, other implementations are within the scope of the following claims.

What is claimed is:

1. A computer-implemented method for mapping of messages, the method comprising:
receiving, from a first web service, a message comprising one or more operations in a first format;

determining that the message includes an asynchronous operation;
in response to determining that the message includes the asynchronous operation, splitting the message into two or more split messages;
for each of the two or more split messages:
identifying a mapping interface that is based on the first web service and that includes an asynchronous mapping for the asynchronous operation;
identifying a second web service that is associated with the asynchronous mapping of the mapping interface;
mapping the split message to the second web service such that the asynchronous operation is in a second format associated with the second web service; and
assigning a logical port connection to the second web service,
wherein splitting the message into the two or more split messages is based on a formatting of a graphical user interface (GUI) of the second web service.

2. The computer-implemented method of claim 1, wherein assigning the logical port connection further comprises providing the mapped message to the second web service.

3. The computer-implemented method of claim 1, wherein identifying the second web service further comprises identifying a plurality of second web services, and wherein mapping the message further comprises mapping the message to the plurality of second web services.

4. The computer-implemented method of claim 1, further comprises storing the message in a repository prior to mapping the message.

5. The computer-implemented method of claim 1, wherein receiving further comprises receiving a plurality of messages in a sequence, and wherein mapping further comprises mapping the messages according to the sequence.

6. The computer-implemented method of claim 1, wherein the message is a XML message.

7. The computer-implemented method of claim 1, wherein in response to determining that the message includes the asynchronous operation, assigning the logical port connection independent of receiving an additional message from the second web service.

8. The computer-implemented method of claim 7, further comprising:
determining that the message includes a synchronous operation;
in response to determining that the message includes the synchronous operation, identifying an additional mapping interface that is based on the first web service and that includes a synchronous mapping for the synchronous operation;
identifying a third web service that is associated with the synchronous mapping of the additional mapping interface;
mapping the message to the third web service such that the synchronous operation is in a third first format associated with the third web service;
assigning an additional logical port connection to the third first web service; and
receiving, from the third web service, a further message.

9. The computer-implemented method of claim 8, wherein the further message is a fault indicating that the third web service is unable to process the synchronous operation.

10. The computer-implemented method of claim 9, wherein the second web service is the same as the third web service.

11. The computer-implemented method of claim 1, wherein splitting the message into the two or more split messages further comprises splitting the message into the two or more split messages based on a size of the message.

12. The computer-implemented method of claim 11, wherein splitting the message into the two or more split messages based on a size of the message further comprises:
for each of the two or more split messages, identifying a data size that the second web service is able to process; and
splitting the message into the two or more split messages based on the data size that each of the second web services is able to process.

13. A non-transitory computer storage medium encoded with a computer program, the program comprising instructions that when executed by one or more computers cause the one or more computers to perform operations comprising:
receiving, from a first web service, a message comprising one or more operations in a first format;
determining that the message includes an asynchronous operation;
in response to determining that the message includes the asynchronous operation, splitting the message into two or more split messages;
for each of the two or more split messages:
identifying a mapping interface that is based on the first web service and that includes an asynchronous mapping for the asynchronous operation;
identifying a second web service that is associated with the asynchronous mapping of the mapping interface;
mapping the message to the second web service such that the asynchronous operation is in a second format associated with the second web service; and
assigning a logical port connection to the second web service,
wherein splitting the message into the two or more split messages is based on a formatting of a graphical user interface (GUI) of the second web service.

14. The non-transitory computer storage medium of claim 13, wherein the operation of assigning the logical port connection further comprises providing the mapped message to the second web service.

15. The non-transitory computer storage medium of claim 13, wherein the operation of identifying the second web service further comprises identifying a plurality of second web services, and wherein the operation of mapping the message further comprises mapping the message to the plurality of second web services.

16. A system of one or more computers configured to perform operations comprising:
receiving, from a first web service, a message comprising one or more operations in a first format;
determining that the message includes an asynchronous operation;
in response to determining that the message includes the asynchronous operation, splitting the message into two or more split messages;
for each of the two or more split messages:
identifying a mapping interface that is based on the first web service and that includes an asynchronous mapping for the asynchronous operation;
identifying a second web service that is associated with the asynchronous mapping of the mapping interface;
mapping the message to the second web service such that the asynchronous operation is in a second format associated with the second web service; and
assigning a logical port connection to the second web service, wherein splitting the message into the two or more split messages is based on a formatting of a graphical user interface (GUI) of the second web service.

17. The system of claim 16, wherein the operation of assigning the logical port connection further comprises providing the mapped message to the second web service.

18. The system of claim 16, wherein the operation of identifying the second web service further comprises identifying a plurality of second web services, and wherein the operation of mapping the message further comprises mapping the message to the plurality of second web services.

* * * * *